Nov. 23, 1926.  1,607,786
J. G. WINSOR ET AL
TRAILER CONSTRUCTION
Filed May 24, 1924   3 Sheets-Sheet 2
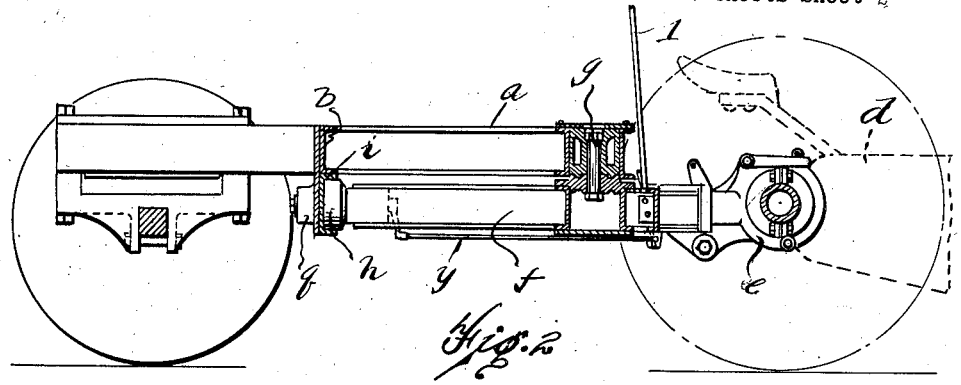
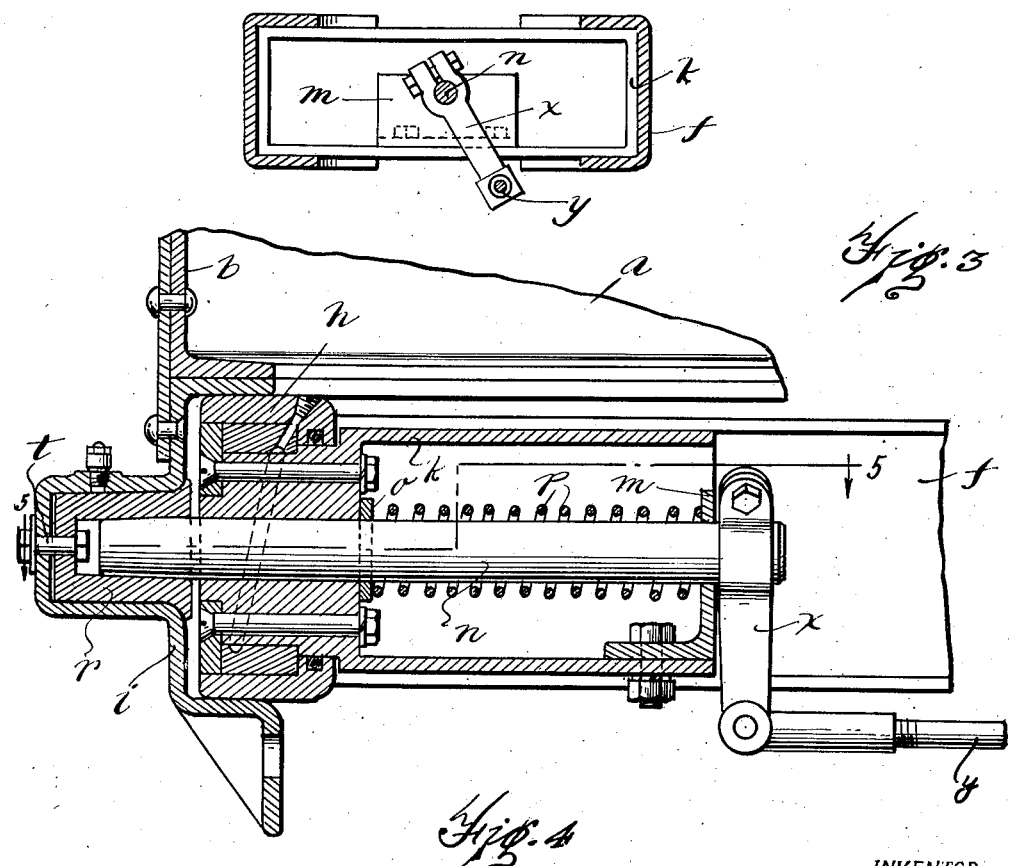
INVENTOR.
James G. Winsor
Sezo Hatashita
BY
Stuart C. Barnes
ATTORNEY.

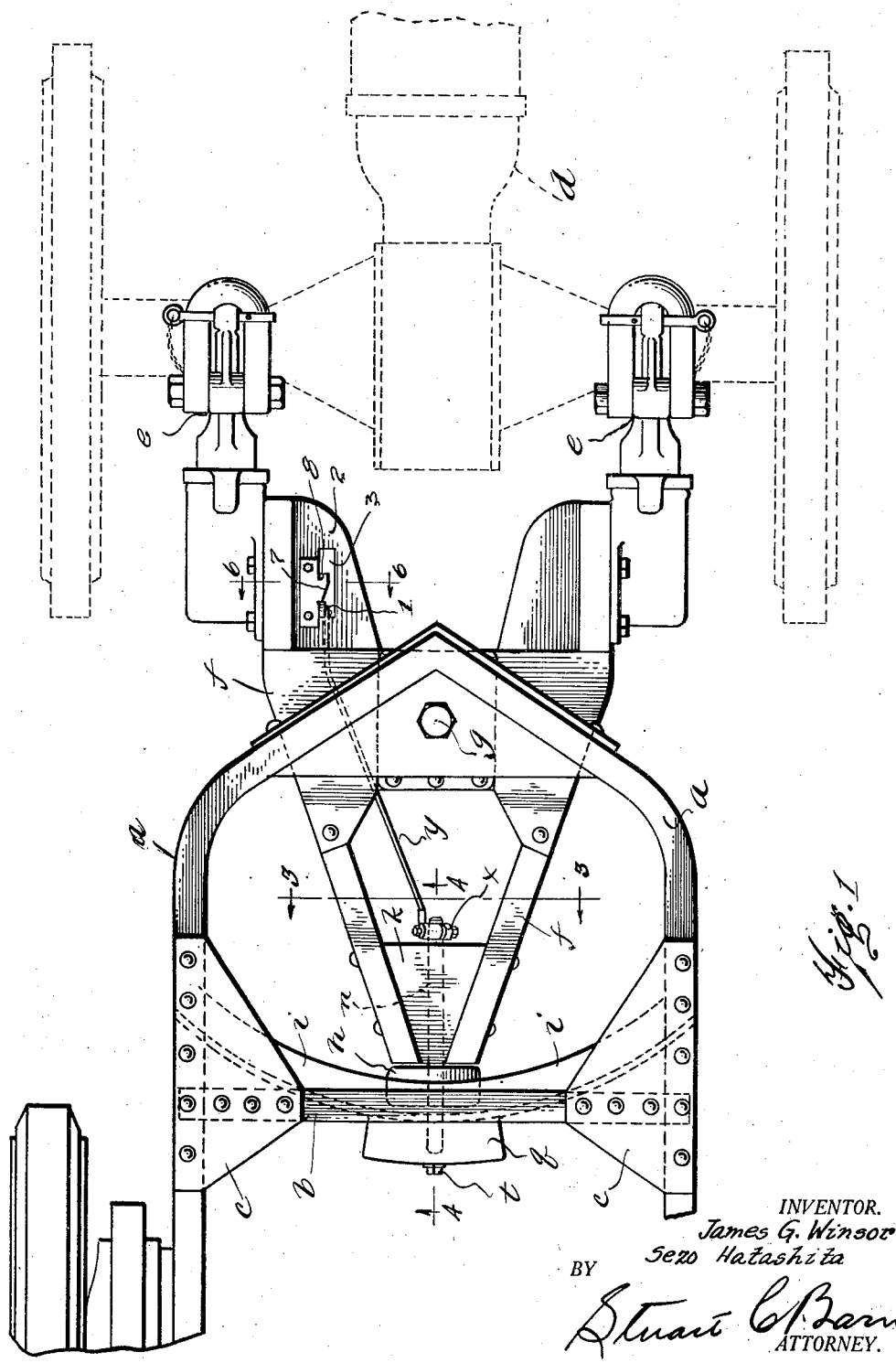

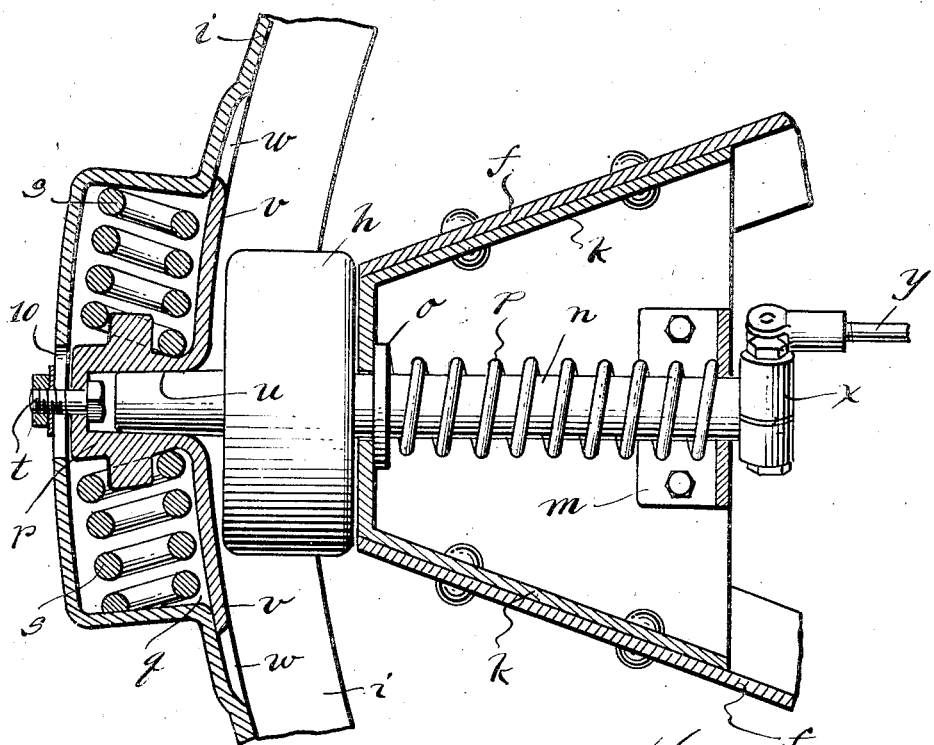
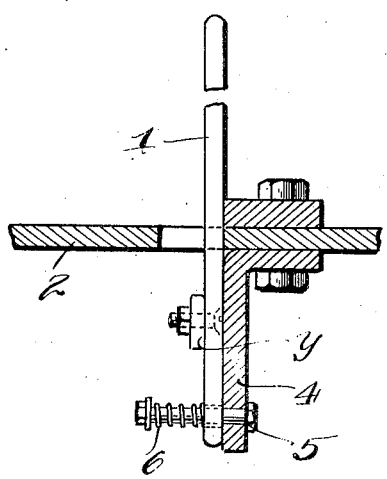

Patented Nov. 23, 1926.

1,607,786

UNITED STATES PATENT OFFICE.

JAMES G. WINSOR AND SEZO HATASHITA, OF ANN ARBOR, MICHIGAN.

TRAILER CONSTRUCTION.

Application filed May 24, 1924. Serial No. 715,530.

This invention relates to semi-trailers and is more particularly directed to the connecting means between the trailer and the towing unit.

In our co-pending application, Serial No. 535,163 we disclose and claim a tail frame construction pivoted to the trailer on a vertical axis. The apex or outer end of said trailer frame is guided within a segmental channel carried by the chassis frame of the trailer.

The object of this invention is to provide means for locking the tail frame to the trailer in such a manner as to cause the trailer and the towing unit to be held in the same straight line, that is, the common center line through the two. A further object is to provide a yielding keeper member so as to provide slight play between the parts in order that the trailer may be steered when backing. It is also our object to provide a construction that is simple and that can be quickly and easily actuated by the operator when he is seated in the towing unit.

In the drawings:

Fig. 1 is a plan view of the semi-trailer showing the rear portion of a tractor in dotted lines.

Fig. 2 is a side elevation partly in section, of our improved form of construction.

Fig. 3 is an enlarged section on the line 3—3 of Fig 1.

Fig. 4 is an enlarged section on the line 4—4 of Fig. 1.

Fig. 5 is an enlarged section on the line 5—5 of Fig. 4.

Fig. 6 is a section on the line 6—6 of Fig. 1, showing the lever control.

$a$ represents the chassis frame of a trailer which is provided with reinforcing cross channels $b$ and the usual gusset plates $c$ to form a rigid structure. The towing unit is designated $d$ and clamped about the axle of the towing unit is a hinge connection $e$ whereby the tail frame $f$ is hingedly connected to the towing unit. Since this is described and claimed in our co-pending application, it will not be necessary to describe this mechanism in detail. It makes no difference so far as this application is concerned whether the tail frame is hinged to the towing unit or is rigidly secured thereto.

The tail frame or wishbone is substantially triangular in shape as shown in Fig. 1, and the semi-trailer is pivoted to this tail frame at $g$ so as to allow the trailer to swing in a horizontal plane with respect to the tail frame. The apex of the tail frame supports the roller $h$ in suitable bearings, said roller adapted to be guided in the segmental channel $i$ which is secured to the underneath side of the trailer chassis frame $a$. This restricts the tail frame from vertical movement with respect to the trailer. So far, this construction is similar to that shown in our co-pending application.

Secured to the tail frame at the apex (Figs. 4 and 5) is a box-like member $k$ which is open at one end, the closed end of which supports the roller $h$ in suitable bearings. A bracket $m$ is secured to this box-like member near the open end and supports a latch pin $n$, the said latch pin projecting through a hole in the closed end of the box member as shown in Fig. 4. A washer $o$ is secured to the latch pin $n$ and a spring $p$ interposed between this washer and the bracket $m$ so as to force the pin into the position shown in Figs. 4 and 5, which is the locking position.

The segmental channel is provided with an elongated recessed portion $q$ in which the keeper member $r$ is fitted. A stud $t$ carried by keeper member is guided in the elongated hole 10 in the segmental channel. Springs $s$ are interposed between the keeper member and end wall of the channel recess $q$ to yieldingly hold the keeper in a central position. The keeper member is provided with a keeper socket $u$ in which the pin $n$ is adapted to project so as to lock the tail frame and the trailer together. The said keeper socket is positioned at the longitudinal center line of the trailer and when the tail frame is locked to the trailer the towing unit and trailer will lie in the same straight line, and it is possible for the operator to back the trailer in a straight path.

However, it is well-nigh impossible to so construct a locking device that will exactly lock the trailer and towing unit in the same straight line, but there is very likely to be a slight irregularity and to overcome this the spring $s$ is utilized to yieldably hold the keeper members in position. The operator can steer the towing unit slightly which will cause the tail frame to swing from side to side, the springs $s$ absorbing this sidewise movement. In this manner the operator is allowed a little leeway in steering when he desires to back the trailer.

The keeper member r is provided with the flanges v which extend laterally and cover the mouth of the elongated recessed portion q. The segmental channel is recessed for a slight distance as at w to allow the flanges v to move laterally. These flanges v provide a surface upon which the pin n can ride before falling into the keeper socket u.

An arm or yoke member x (Fig. 3) is secured on the other end of the pin n and a connecting link y connects this yoke member to the operating lever 1. A plate 2 is secured to the forward end of the tail frame adjacent the towing unit and is provided with a slot 3, through which passes the handle 1. A bracket 4 is secured to the underside of the plate 2, and the operating lever 1 is pivoted as at 5, to this bracket. A spring 6 normally presses the operating lever to one side of the slot as shown in Figs. 1 and 6. In Fig. 1 it will be noted that the slot is cut in such a manner as will leave a shoulder portion 7 at one side of the slot. The lever 1 is adapted to be pulled backwardly and to be engaged in the notched portion 8 behind the shoulder 7, so as to hold the lever in an unlocked position. When the lever is thus positioned in the forward position the locking pin will be withdrawn from the keeper socket and the trailer is free to swivel on the tail frame about the pivot g.

What we claim is:

1. The combination of a towing unit, a tail-frame carried thereby and secured against swiveling in respect to the unit in horizontal plane, a trailer provided with a chassis frame, a swiveling connection between the chassis frame and tail-frame whereby the trailer is allowed to swivel in a horizontal plane, and locking means for locking the chassis frame and the tail frame together, this locking means providing a resilient connection between the chassis frame and the tail-frame, whereby the trailer and the towing unit are normally held in a straight line, and whereby the chassis frame has a swiveling movement with respect to the tail movement within limits defined by the resilient connection.

2. The combination of a towing unit, a wish bone tail frame carried thereby and secured to the unit against swiveling in a horizontal plane, a trailer provided with a chassis frame, a swivel connection between the chassis frame and tail frame at an intermediate point of said tail frame, a segmental guide channel carried by the trailer chassis frame for guiding the tail frame and provided with a recess, and a locking pin carried by said tail frame and adapted to be projected into the said recess for the purpose of locking the tail frame and trailer together.

3. The combination of a towing unit provided with an axle, a tail frame secured to the two ends of the axle, a trailer provided with a chassis frame, a swiveling connection between the chassis frame and tail frame at an intermediate point of said tail frame, a segmental guide channel carried by the said chassis frame the end of said tail frame adapted to be guided therein, and means for locking the said tail frame to the trailer so as to locate the trailer in a straight line position with respect to the towing unit.

4. The combination of a towing unit provided with an axle, a tail frame secured to the two ends of the axle, a trailer provided with a chassis frame, a swiveling connection between the chassis frame and tail frame, a segmental channel guide carried by said chassis frame for guiding the tail frame and provided with a recess, a pin carried by said tail frame and adapted to be yieldingly projected within said recess to lock the trailer and tail frame together.

5. The combination of a towing unit provided with an axle, a wish-bone tail frame secured to the two ends of the axle, a trailer provided with a chassis frame, a swiveling connection between the chassis frame and tail frame, a segmental channel guide carried by the chassis frame for guiding the apex of the tail frame and provided with a recess, a locking pin carried by the said tail frame adapted to be yieldingly projected within said recess, an operating lever positioned at a point removed from said locking pin connections between said lever and locking pin, and means for locking said operating lever to hold the locking pin in an unlocked position.

6. The combination of a towing unit, a tail frame carried thereby, a trailer provided with a chassis frame, a swiveling connection between the chassis frame and tail frame at an intermediate point of said tail frame, a segmental channel guide carried by the chassis frame adapted to receive the end of the tail frame to guide the same and provided with a recess, a keeper positioned within the recess and provided with a recessed socket, and means for yieldingly holding the said keeper socket at the center line of the trailer, and a pin carried by the tail frame adapted to be projected within the said keeper socket to lock the trailer and towing unit in a straight line position.

7. The combination of a towing unit, provided with an axle, a tail frame secured to the two ends of the axle, a trailer provided with a chassis frame, a swiveling connection between the chassis frame and tail frame, a segmental guide carried by said chassis frame for guiding the tail frame and provided with an elongated recess, a keeper member slidable in said recess, means for yieldingly holding said keeper at the center line of the trailer, and a pin carried by the apex of the tail frame adapted to be yieldingly projected within said keeper member for the purpose of locking the trailer and towing unit in a straight line position.

8. The combination of a towing unit, a tail frame carried thereby, a trailer provided with a chassis frame, a swiveling connection between the chassis frame and the tail frame, a segmental guide carried by said chassis frame for guiding the tail frame and provided with an elongated recess, a keeper member slidably guided in said recess and provided with a recess, said recess forming a keeper socket, springs for yieldingly exerting a force on opposite sides of said keeper member, a pin carried by the tail frame, and means for projecting the said pin within the keeper socket for the purpose of locking the trailer and towing unit in a straight line position.

9. The combination of a towing unit, a tail frame carried thereby, a trailer provided with a chassis frame, a swiveling connection between the chassis frame and tail frame, a segmental guide carried by said chassis frame for guiding the tail frame and provided with an elongated recess, a keeper member having a keeper socket and slidable in said recess and provided with laterally extending flanges adapted to cover the mouth of said elongated recess, and a pin carried by the tail frame adapted to project within the segmental channel guide and to bear against the walls of said channel guide and said flanges carried by the keeper member as the trailer swivels about the tail frame, said pin adapted to be projected within the keeper socket when the trailer and towing unit lie in a straight line position for the purpose of locking the same together in such position.

10. The combination of towing unit, a trailer swivelled to the towing unit to turn on a vertical axis, means for locking the trailer and towing unit together to prevent such full swinging action, and means associated with said lock to permit a relatively small yield of said lock, this associated means acting to return the parts to their original position when such relatively small yield has taken place.

11. The combination of a towing unit, a tail-frame carried thereby, a trailer provided with a chassis frame, a swivel connection between the chassis frame and the tail-frame whereby the trailer is allowed to swivel in a horizontal plane, and cooperating locking members on the chassis frame and tail-frame for locking them against full swiveling movement, one of these locking members being spring pressed whereby limited swiveling movement is permitted against the action of the spring.

In testimony whereof they have affixed their signatures.

JAMES G. WINSOR.
SEZO HATASHITA.